128,846

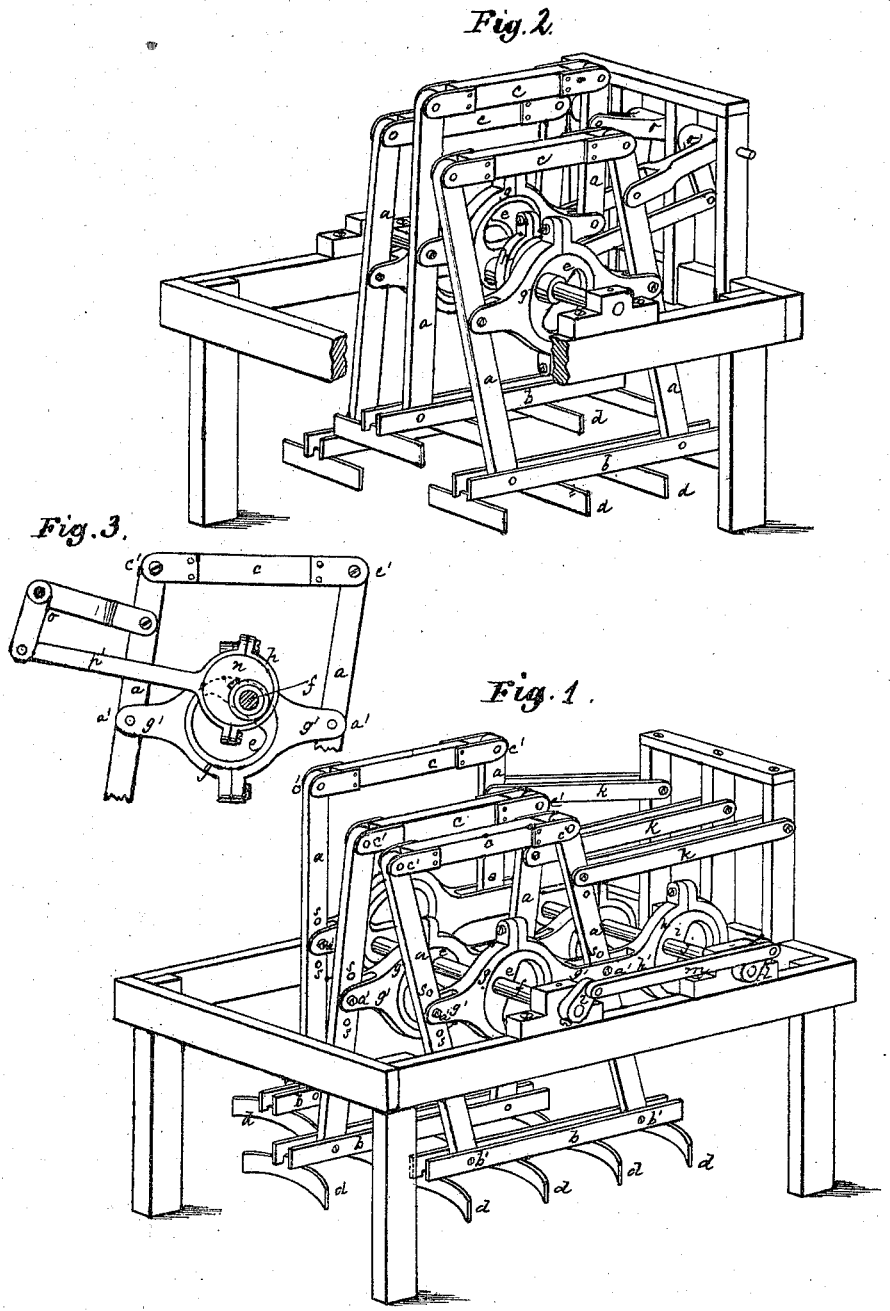

UNITED STATES PATENT OFFICE.

CHRISTOPHER C. BRAND AND CHRISTOPHER C. MOORE, OF NORWICH, CONNECTICUT.

IMPROVEMENT IN PROPULSION OF NAVIGABLE VESSELS.

Specification forming part of Letters Patent No. 128,846, dated July 9, 1872.

*To whom it may concern:*

Be it known that we, CHRISTOPHER C. BRAND and CHRISTOPHER C. MOORE, both of Norwich, Connecticut, have invented certain new and useful Improvements in Apparatus for Propelling Boats by steam or other power, of which the following is a specification:

The principal feature of our invention consists of an articulated bucket-frame carried by a cam or eccentric which, when rotated, imparts an up and down and back and forth movement to said frame, in combination with mechanism substantially such as hereinafter described, for maintaining horizontal, or substantially so, that portion of the frame to which the buckets are attached, and for increasing the throw or back and forth movement of the same, so that the buckets, during the rotation of the frame-carrying eccentric, may be caused to move in substantially an elliptic path, and at the same time to preserve at all times their verticality. We combine together a series of three bucket-carrying frames, each operated by its own mechanism, and so arranged as to act successively on the water, in order to insure continuity of action of the propelling buckets.

In the accompanying drawing, Figure 1 is a perspective view of a series of bucket-carrying frames and their actuating mechanism, arranged and operating in accordance with our invention. Fig. 2 is a like view of said frames, with a modified arrangement of the mechanism for increasing the throw and maintaining the verticality of the buckets. Fig. 3 is a like view of a portion of the apparatus in Fig. 2, taken from the opposite side of the apparatus, and representing more clearly the mechanism for increasing the throw and maintaining the verticality of the buckets.

The frame which carries the buckets consists of two upright bars, $a$, a lower horizontal bar, $b$, hinged or jointed at the points $b'$ to the lower ends of bars $a$, and an upper horizontal bar, $c$, hinged in like manner at the points $c'$ to the upper ends of the bars $a$. This upper bar, however, is only used to give more stability to the frame, and it may be dispensed with if desired. The lower bar $b$ has firmly attached to it by proper means the buckets or paddles $d$, which may be of any suitable shape and construction. The bucket-frame is carried by an eccentric disk, $e$, mounted and fixed on a shaft, $f$, an annular central frame, $g$, arranged within the area of the bucket-carrying frame, serving to connect the latter with the eccentric, by encircling the eccentric, and having its two side ears or extensions $g'$ pivoted at $a'$ to the side-bars $a$ of the bucket-frame. The shaft $f$ is supported in suitable bearings, and when rotated will, through the medium of the eccentric and its encircling strap-frame, cause the bucket-frame to move up and down and to and fro. In order to preserve the horizontal position of the bucket-bar $b$, one of the arms $g'$ of the annular strap $g$ is extended and fastened to a like arm, $h'$, of a second strap, $h$, the counterpart of strap $g$, encircling an eccentric, $i$, the counterpart of eccentric $e$, mounted on a rotary-shaft, $j$, parallel to and in the same horizontal plane with shaft $f$. The two eccentrics are arranged in similar positions on their respective shafts, and by reason of the above-described arrangement the two points $a'$ are preserved in a horizontal plane during the movements of the eccentrics, thus maintaining at all times the horizontalism of the bar $b$ and the consequent verticality of the buckets $d$. If the buckets were actuated only by the eccentrics they would move in a circular path and would have but a comparatively limited throw. In order to make their movement elliptical, for the purpose of giving them a greater sweep through the water, we make use of a link or rod, K, pivoted at one end to one of the side-bars $a$, and at the other to some stationary part of the vessel or boat in which the propeller is placed, the arrangement of this rod being substantially such as shown in the drawing, Fig. 1, and its effect is to increase very considerably the horizontal sweep of the paddles or buckets, the inclination of the side-bars $a$ during the rotation of the eccentric being constantly changed, thus producing a vibratory back and forth movement of the frame in addition to the movement obtained from the eccentric.

In practice we put together several of these bucket-carrying frames, as shown in Fig. 1, using the same shafts for the eccentrics of each frame, each set of eccentrics being placed in a different position on the shaft from the set adjoining, so that the one frame may be about to rise when the next is about to descend, thus causing the frames to rise and fall one after the other for the purpose of insuring continuity of action of the buckets on the water. The two shafts $f$ and $j$ are connected by cranks $l$ and a rod, $m$, so as to move together. In Figs. 2 and 3 is shown a modified arrangement of the mechanism for maintaining the verticality of the buckets and giving them a greater sweep. In this arrangement the bucket-carrying frames and the eccentrics and annular straps within the same are similar to like-lettered parts in Fig. 1. In lieu, however, of the rods and the second shaft $j$ with eccentrics $i$ and encircling straps $h$ connected with the parts, as shown in Fig. 1, we dispense with the second shaft $j$, and by the side of each eccentric $e$ we fix on the shaft $f$ a second eccentric, $n$, connected by a strap, $p$, and connecting-rod, $p'$, with a bell-crank or angle-lever, $o$, vibrating upon a pivot attached to some stationary part of the boat. The rod $p'$ is jointed to the end of the upright arm of the angle-lever, and the longer horizontal arm of said lever is jointed to one of the side bars or uprights $a$ of the bucket-carrying frame. The angle-lever, in this instance, serves both to increase the throw or sweep of the buckets, and to maintain at all times the points $a'$ $a'$ in substantially a horizontal plane, thus insuring the verticality of the paddles or buckets. The eccentric $n$ and bell-crank lever $o$ are proportioned substantially as shown; and the said eccentric $n$ is fixed on the shaft $f$, so as to occupy, in relation to the larger eccentric $e$, the position indicated in Fig. 3. The proportions of these parts and the length of the connecting-rod may be varied. The arrangement shown indicates with sufficient clearness the manner in which they operate together. The angle-lever, controlled in its movement by the eccentric $n$, causes the bucket-frame to vibrate back and forth on the pivots $a'$ $a'$, so as to increase the horizontal sweep of the buckets, and the rise and fall of its longer arm is so timed, with relation to the movement of the eccentric $e$, that the points $a'$ $a'$ are always kept in substantially a horizontal plane.

A series of bucket-frames, each with its own actuating mechanism, are shown placed together in a manner similar to that already described with relation to Fig. 1.

In order to give more or less dip and throw to the buckets, as desired, the uprights $a'$ $a'$ may, as shown in Fig. 1, be provided with a series of holes, $s$; into any of the corresponding holes of each set of uprights, the pivots $a'$ $a'$ may be adjusted.

Having now described our invention, and the manner in which the same is or may be carried into effect, what we claim, and desire to secure by Letters Patent, is—

1. The combination of an articulated bucket-frame and a rotary eccentric arranged between the sides of and carrying the same, substantially as described, with a second eccentric, and one or more links, rods, or levers operating together with said bucket-frame and bucket-frame eccentric, substantially in the manner set forth, so that the buckets, while describing an elliptic course, shall be kept at all times in a vertical position.

2. We do not claim broadly a series of buckets arranged to enter the water one after the other, but we claim a propelling apparatus, consisting of two or more bucket-carrying frames, each arranged and operated as specified in the preceding clause, having their movements so timed as to act successively or one after the other on the water, for the purpose of insuring continuity of action of the buckets.

In testimony whereof we have signed this our specification in the presence of two subscribing witnesses.

C. C. BRAND.
C. C. MOORE.

Witnesses:
A. POLLOK,
CHAS. WEBB.